US010253871B2

United States Patent
Hose

(10) Patent No.: US 10,253,871 B2
(45) Date of Patent: Apr. 9, 2019

(54) HILL ASCENT METHOD

(71) Applicant: JAGUAR LAND ROVER LIMITED, Warwickshire (GB)

(72) Inventor: Markus Hose, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 200 days.

(21) Appl. No.: 15/317,433

(22) PCT Filed: Jun. 1, 2015

(86) PCT No.: PCT/EP2015/062176
§ 371 (c)(1),
(2) Date: Dec. 9, 2016

(87) PCT Pub. No.: WO2015/189065
PCT Pub. Date: Dec. 17, 2015

(65) Prior Publication Data
US 2018/0156329 A1 Jun. 7, 2018

(30) Foreign Application Priority Data
Jun. 12, 2014 (GB) .................................. 1410449.1

(51) Int. Cl.
*F16H 61/02* (2006.01)
*B60W 30/18* (2012.01)
(Continued)

(52) U.S. Cl.
CPC ......... *F16H 61/0213* (2013.01); *B60W 10/11* (2013.01); *B60W 10/113* (2013.01);
(Continued)

(58) Field of Classification Search
CPC .... F16H 61/0213; F16H 61/16; F16H 61/688; F16H 59/74; F16H 2059/147;
(Continued)

(56) References Cited

U.S. PATENT DOCUMENTS 6,428,120 B1 * 8/2002 Holl ........................ B60T 7/122
303/191
8,649,948 B2 * 2/2014 Yanagida ................ B60T 7/122
701/51

(Continued)

FOREIGN PATENT DOCUMENTS

CN 101660601 A 3/2010
DE 10308691 A1 9/2003
(Continued)

OTHER PUBLICATIONS

Combined Search and Examination Report under Sections 17 and 18(3) for Application No. GB1410449.1 dated Dec. 11, 2014.
(Continued)

*Primary Examiner* — Jacob S. Scott
*Assistant Examiner* — Tinh Dang
(74) *Attorney, Agent, or Firm* — Carlson, Gaskey & Olds

(57) ABSTRACT

Aspects of the present invention relate to a method of using a transmission with multiple clutches in order to provide improved methods of traction control on a hill ascent. Embodiments provide for the use of power-shift, automatic or dual clutch gearboxes.

20 Claims, 4 Drawing Sheets

(51) Int. Cl.
    *B60W 10/11*      (2012.01)
    *B60W 10/113*      (2012.01)
    *B60W 10/18*      (2012.01)
    *B60W 50/14*      (2012.01)
    *F16H 59/66*      (2006.01)
    *F16H 61/16*      (2006.01)
    *F16H 61/688*      (2006.01)
    *F16H 59/14*      (2006.01)
    *F16H 59/24*      (2006.01)
    *F16H 59/44*      (2006.01)
    *F16H 59/54*      (2006.01)
    *F16H 59/74*      (2006.01)
    *F16H 59/50*      (2006.01)

(52) U.S. Cl.
    CPC ...... *B60W 10/18* (2013.01); *B60W 30/18036* (2013.01); *B60W 30/18118* (2013.01); *B60W 50/14* (2013.01); *F16H 61/16* (2013.01); *F16H 61/688* (2013.01); *B60W 2510/0604* (2013.01); *B60W 2510/0657* (2013.01); *B60W 2510/0661* (2013.01); *B60W 2510/0666* (2013.01); *B60W 2510/1005* (2013.01); *B60W 2520/10* (2013.01); *B60W 2520/16* (2013.01); *B60W 2520/26* (2013.01); *B60W 2520/28* (2013.01); *B60W 2540/02* (2013.01); *B60W 2540/04* (2013.01); *B60W 2540/10* (2013.01); *B60W 2540/12* (2013.01); *B60W 2540/14* (2013.01); *B60W 2550/12* (2013.01); *B60W 2550/141* (2013.01); *B60W 2550/142* (2013.01); *B60W 2550/148* (2013.01); *B60W 2710/1005* (2013.01); *B60Y 2200/20* (2013.01); *F16H 59/141* (2013.01); *F16H 59/24* (2013.01); *F16H 59/44* (2013.01); *F16H 59/54* (2013.01); *F16H 59/66* (2013.01); *F16H 59/74* (2013.01); *F16H 2059/147* (2013.01); *F16H 2059/506* (2013.01); *F16H 2059/663* (2013.01); *F16H 2059/666* (2013.01); *F16H 2059/743* (2013.01); *F16H 2061/0234* (2013.01); *F16H 2312/09* (2013.01)

(58) Field of Classification Search
    CPC ....... F16H 2059/506; B60W 30/18118; B60W 30/18036; B60W 10/113; B60W 50/14; B60W 10/11; B60W 10/18; B60W 2520/16; B60W 2520/28; B60W 2710/1005; B60W 2510/0604; B60W 2510/0657; B60W 2510/0661; B60W 2510/0666; B60W 2510/1005; B60W 2520/10; B60W 2550/141; B60W 2520/26; B60W 2540/02; B60W 2540/04; B60W 2540/10; B60W 2540/12; B60W 2540/14; B60W 2550/12
    See application file for complete search history.

(56) References Cited

U.S. PATENT DOCUMENTS

| | | | |
|---|---|---|---|
| 8,791,803 B2* | 7/2014 | Ishikawa | G01M 15/042 340/425.5 |
| 9,050,906 B2* | 6/2015 | Ito | B60L 3/00 |
| 9,283,962 B2* | 3/2016 | Nakaso | B60T 7/122 |
| 10,065,640 B2* | 9/2018 | Yang | B60W 10/06 |
| 2003/0116399 A1 | 6/2003 | Tietze | |
| 2004/0249542 A1 | 12/2004 | Murasugi et al. | |
| 2009/0152070 A1 | 6/2009 | Nakamura et al. | |
| 2014/0345890 A1 | 11/2014 | Nagamura et al. | |

FOREIGN PATENT DOCUMENTS

| | | |
|---|---|---|
| EP | 2159456 A2 | 3/2010 |
| JP | H01197128 A | 8/1989 |
| JP | 2005172235 A | 6/2005 |
| JP | 2007057042 A | 3/2007 |
| JP | 2010236630 A | 10/2010 |
| JP | 2011179597 A | 9/2011 |
| WO | 03/074904 A2 | 9/2003 |
| WO | 2014/027111 A1 | 2/2014 |

OTHER PUBLICATIONS

International Search Report and Written Opinion of the International Searching Authority for International application No. PCT/EP2015/062176 dated Aug. 5, 2015.
Patent Office of the People's Republic of China, Patent Application No. CN 201580031399.2, First Search Report dated Mar. 19, 2018.

* cited by examiner

HILL ASCENT METHOD

TECHNICAL FIELD

The present invention relates to a method of traction control for a vehicle, particularly a vehicle that is ascending a hill; a control system for implementing a control method, a powertrain equipped with such a control system, and a vehicle equipped with such a powertrain or control system.

BACKGROUND OF THE INVENTION

It is known to provide a vehicle with a traction control system, which may be provided with various off-road modes, particularly but not exclusively 4×4 vehicles, and particularly but not exclusively for use in such vehicles that may be required to operate off-road and/or in challenging conditions, said conditions being challenging either as a result of terrain type or of weather conditions. Such conditions (and their associated modes) may include Grass, Gravel and Snow (GGS), but may also include rocky terrain (or 'rock crawl'), mud and ruts, ice, sand and/or steep gradients. In particular, such vehicles may be required to make ascents on slopes comprising gradients that are particularly steep. Such vehicles may be provided with a 'hill descent' mode, which nominally means that a driver is not required to manually activate brakes or manually change gears in order to maintain a controlled descent of a steep slope. Hill descent methods are well known in the art and need not further be discussed here.

On occasion a vehicle may be driven up a slope on which ultimately it is unable to make further progress—a 'failed ascent'. This may be as a result of insufficient power available to the vehicle from the engine or prime mover or, more usually, as a result of a loss of sufficient traction. It is not unknown for drivers of a vehicle in such a situation to feel a loss of control unless appropriately trained.

An appropriate response to a failed ascent in the prior art in a vehicle with a manual gearbox is a method as follows:

If the driver notices that the ascent of a slope has failed, i.e.: the wheels are driving but the vehicle is no longer ascending, or is even going backwards, the correct response is to brake hard and initiate an engine stall. In most circumstances the vehicle will then come to rest, braked, on the slope.

Alternatively, slope ascent may fail when the engine stalls. The correct response is also to brake in this scenario, so that the vehicle comes to rest, braked, on the slope.

In either case, the failed ascent results in the vehicle sitting at rest, braked, on the slope. Still pressing the brake pedal, the driver then opens the clutch (presses clutch pedal), selects reverse gear, and re-engages the clutch (releases clutch pedal).

The brake pedal is then released. The vehicle is then held on the slope by engine friction acting through the driveline and the engaged reverse gear.

The vehicle engine is then re-started. The vehicle then descends the slope in reverse gear under engine braking. If available, a hill descent mode may be used to assist in control of the descent, if one is available on the vehicle. Once the slope has been cleared, the driver of the vehicle may reattempt the ascent or choose an alternative route.

In a vehicle with an automatic gearbox, an equivalent method is as follows:

If the driver notices that the ascent has failed, the correct method of response is to brake so that the vehicle is at rest, braked, on the slope.

In some circumstances, an engine of the vehicle may stall in this scenario. The driver then brakes, selects neutral, restarts the engine, selects reverse and releases the brake. The vehicle will then descend the slope in a controlled fashion under engine braking in reverse gear.

Alternatively, if the vehicle has not stalled, the driver simply selects reverse and releases the brake—the vehicle will then descend the slope in a controlled fashion under engine braking in reverse gear.

Again, in either scenario (stall or non-stall), to assist in control of the descent, the driver may make use of the wheel brakes or, if available, a hill descent mode.

Once clear of the slope the ascent may be reattempted, or an alternative route may be chosen.

The Hill Ascent failure recovery methods noted above are known to skilled off-road driving practitioners. Inexperienced drivers, however, may panic upon the realisation that a hill ascent has failed. Where a failure is due to the limits of traction having been reached, for example, it is not an uncommon response to continue to attempt to drive up a slope by simply pressing harder on the accelerator. In a situation where the vehicle has stalled, a natural response is simply to brake hard. Further steps of selecting reverse and so on may not be known, and an attempt may be made to allow the vehicle to roll backwards down the slope with only the wheel brakes to control the descent. This is not advisable since, with no engine running, wheel brakes may not be as effective due to a lack of servo assistance, and a hill descent mode is also likely to be unavailable to assist in the descent.

Furthermore, vehicles tend to have a bias of braking to the front, so braking on descent in reverse tends to result in front wheel lock (unless a centre differential, where available, is locked), and an undesirable loss of lateral stability at the front end of the vehicle. Some drivers may attempt to re-start the vehicle and continue to attempt to drive up the gradient, leading to a very difficult hill-start and most likely to further failure.

What is required is an improved method of dealing with a failed hill ascent. The method may be one in which an appropriate response does not require driver input—in case the driver is inexperienced—and in which the maximum amount of control is retained.

SUMMARY OF THE INVENTION

Modern vehicle transmissions may include multi-speed gearboxes for example 'power shift' or 'dual clutch' gearboxes with the ability to pre-select a multiplicity of gear ratios and shift between such selected ratios.

It is known to provide, and it is envisaged that embodiments of the invention will provide for, a multi-speed constant mesh gearbox having at least one input and an output, two or more forward speed ratios and one or more reverse speed ratios between said input or inputs and output, further being provided with a plurality of clutches, at least one of said clutches preferably being a friction clutch, which may be engaged in various combinations with a plurality of gears and gearbox shaft components in order to enable the various speed ratios, said gearbox being adapted for pre-selection of a next required speed ratio in use, and for changing from a current speed ratio to said next required speed ratio; wherein said speed ratios are arranged for pre-selection to provide a shift between two forward speed ratios, a shift between two reverse speed ratios, and/or a shift between forward and reverse speed ratios.

There may be two inputs to such a gearbox, typically relating to a dual clutch transmission (DCT) in which two inputs from a source of motive power, such as an internal combustion engine, are used alternately to provide drive to the transmission. A DCT transmission is typically characterized by two clutches which are alternately engaged, one clutch being associated with 'odd' ratios, and one clutch being associated with 'even' ratios. Generally speaking one of the clutches is adapted for engagement from a condition in which a motor vehicle is stationary, and is associated with normal first speed ratio of a set of speed ratios associated with a highway transmission. DCT transmissions are well known, and need not be further described here.

The arrangement of gear wheels, shafts and clutches within the transmission according to embodiments of the invention provides for a shift (with substantially continuous transmission of torque to the vehicle driving wheels) between forward speed ratios, between reverse speed ratios, and between forward and reverse speed ratios. Such an arrangement ensures versatility in a transmission suitable for both on-highway and off-highway use.

Surprisingly it has been found that a transmission as described above can provide advantages with regards to the problems of hill ascent failure as herein described.

According to an aspect of the present invention there is provided a method of controlling a vehicle having a transmission comprising at least one forward and at least one reverse selectable gear ratio, at least two clutches, each able to connect at least one of said gear ratios to torque from an engine or prime mover of the vehicle and at least one wheel driven via the transmission, the method comprising:
  selecting and/or engaging a forward or reverse gear ratio via a first clutch;
  pre-selecting an opposing reverse or forward gear ratio via a second clutch;
  determining that a hill ascent has failed;
  selecting and/or engaging an opposing reverse or forward gear.

Where a vehicle is ascending a slope in a forwards direction, the gear ratio initially selected is a forwards gear, and the pre-selected, and subsequently engaged, gear ratio is a reverse gear.

Alternatively, when a vehicle is ascending a slope going backwards, the method may comprise selecting a reverse gear ratio via the first clutch, then pre-selecting and subsequently engaging a forwards gear ratio via the second clutch. The clutches may comprise friction clutches.

It will be readily understood by those skilled in the art that, within the scope of this application, the term 'forwards' may be substituted for by 'reverse' (or 'backwards') and vice versa in this description in many instances and accordingly further description herein may be interpreted as such in order to obviate unnecessary duplication and description complexity when describing the relative motion of a vehicle which may attempt to ascend a slope or gradient in reverse or backwards, just as well as forwards.

According to an aspect of the present invention there is provided a method of hill ascent failure control for a vehicle provided with:
  a transmission comprising at least one forward and at least one reverse selectable gear ratio;
  at least two clutches, each able to connect at least one of said gear ratios to torque from an engine or prime mover of the vehicle;
  at least one wheel driven via the transmission;
the method comprising:
  selecting or engaging a forward or reverse gear ratio via a first clutch;
  pre-selecting an opposing reverse or forward gear ratio via a second clutch;
  determining that a hill ascent has failed; and
  selecting or engaging said opposing reverse or forward gear.

In embodiments, pre-selection of the opposing gear may occur during ascent of a slope or prior to an ascent of a slope.

Having shifted into reverse gear from a forward gear upon an ascent failure, the vehicle may then be driven in reverse back down the slope, under control and with the assistance of engine braking via the reverse gear. In an embodiment, where available the vehicle may enter a 'hill descent mode', such as Hill Descent Control™ or HDC®, which provides assistance to the driver during the descent. Such a hill descent mode may be manually selected or may be automatically selected by a system or controller or other mode embodied in the vehicle, such as a 'Terrain Response®' mode or equivalent.

In an embodiment, the selection and/or pre-selection of gear ratios may be automatic and/or may be controlled by a system or controller or mode of the vehicle.

In an embodiment, the method comprises a step of applying wheel brakes. It may be that upon detection or determination of a hill ascent failure, wheel brakes of the vehicle are applied. This may occur under the control of a system or controller which may reside within the vehicle. Said system may comprise software or hardware and may be part of any of various other systems or controllers within the vehicle. Such systems or controllers are known, for example, ECUs. In accordance with this embodiment, a low or the lowest gear having been selected and a reverse gear pre-selected, a hill ascent failure is detected or determined. The wheel brakes are then applied. This in effect mirrors the procedure in prior art driver-controlled hill ascent failure methods. A possible method step of disengaging the engaged forwards gear may occur prior to, during, or after the application of the wheel brakes. The method step of engaging the pre-selected reverse gear may likewise occur prior to, during, or after the application of the wheel brakes. A clutch or other engagement means may be used and/or controlled so as to prevent or manage any system conflict between an engaged gear and a braked condition.

In an embodiment, application of wheel brakes and disengagement of the engaged forwards gear occur at least partially simultaneously (in other words, these two actions may occur such that the respective times of their occurrence at least partly overlap), so as to bring the vehicle to a halt, so that it is at rest, braked, on the slope. The vehicle may then remain in this situation for a period of time, a 'rest period'—such period of time may be pre-determined or may be sensitive to driver input. For example, the vehicle may come to a halt as described and then an information system of the vehicle may inform a driver of the vehicle that a hill ascent failure has occurred. This would mean that said driver would then understand why the vehicle has come to a halt. In the case of an inexperienced driver, as postulated under the section 'Background of the Invention' above, this will avoid any panic or other nervousness as described. The driver may then also be informed of the next action or actions of the hill ascent failure method, for example that the selection/engagement of reverse gear will occur and descent of the slope may then begin. It may be that the driver will then be prompted to signal that they are ready for this action to occur, and this may then be the signal that the rest period is over. Said signal may be a press and release of a brake pedal, or a release of a brake pedal, or a press or a release of an accelerator pedal, or any other suitable signal, such as a vehicle mode selection or a press of a button, real or virtual—a virtual button may for example appear or be present on a touchscreen of the vehicle. At the end of the rest period, the reverse gear is selected and the wheel brakes are released—these actions may occur at least partially simultaneously. As described elsewhere herein, the vehicle may then descend the slope in a controlled fashion in the reverse gear.

In a further embodiment, as the wheel brakes of the vehicle are engaged and/or the forwards gear is disengaged, a throttle or accelerator signal to an engine of the vehicle is moderated. Said moderation may involve a decrease in or lowering of a driver demand for engine speed/torque. This would obviate the situation where a hill ascent failure has been detected, and a method of the invention has been employed, but a driver of the vehicle, perhaps inexperienced, persists in making a torque demand (such as by continuing to press on an accelerator pedal). In a scenario where a gear has been disengaged this may result in very high engine speeds which at best may make excessive noise which may further unsettle a driver. Other undesirable effects may include sudden acceleration upon subsequent selection of any gear. It may be that the engine is controlled such as to idle or maintain any other relatively low speed.

In an embodiment, pre-selection of the reverse gear ratio occurs either prior to, or during ascent of, a steep slope.

In embodiments, pre-selection of the reverse gear ratio may be in response to a condition indicating that an ascent of a steep slope is being attempted. Such a condition may be that a low or the lowest available forwards gear has been selected by an automatic gearbox, particularly where that gear is not normally required for most driving conditions. This is contrary to the normal use of such gearboxes in the prior art, particularly DCT-type gearboxes, where a low or the lowest forwards gear (e.g. first) is normally accompanied by a pre-selection of the next highest forwards gear ratio (e.g. second) as it will be expected that the vehicle will gain speed by use of the low gear so that the next gear will be the next required.

The condition may be that a particular vehicle mode potentially associated with a hill ascent has been selected, either by the driver or automatically by a system, controller or other mode embodied within the vehicle. Such a mode may be a mode which is suited for hilly terrain, rocky terrain, sand, or any other suitable particular traction control mode. A mode, controller or system which controls switching between a number of other possible vehicle modes may be that known as 'Auto Terrain Response™' or any similar such mode, controller or system known in the art. HDC® or a similar such mode may be the mode selected, as it may be anticipated that a hill climb may be followed by a hill descent. Modes, controllers and systems and their suitability will be known to and appreciated by those skilled in the art.

If a suitable such mode is selected, the lowest forwards gear ratio may be selected, particularly where such lowest ratio is not typically used in normal driving conditions, and/or pre-selection of a reverse gear ratio may then occur automatically.

A condition for pre-selecting reverse gear ratio may be that previous gear ratio selections have been consecutively downwards (e.g. from $4^{th}$, to $3^{rd}$, to $2^{nd}$, to $1^{st}$ [or lowest] gear) without an accompanying decrease in power or torque requirement from an engine of the vehicle. This would be consistent with a vehicle that is attempting to travel up a slope, as opposed to a vehicle that is merely shifting gears in response to a speed reduction, as may be experienced in normal or 'on-road' driving, such as when slowing down, where no or low demand is made for engine torque or power and speed is dropping. In this embodiment, where shifts have been consecutively down but with no reduction in power or torque requirement, once the $1^{st}$/lowest gear has been selected but a high power or torque demand is still being made, the condition is set for pre-selection of the reverse gear, as a hill ascent may then be assumed.

A condition for selection of a lowest forwards gear ratio and/or pre-selection of a reverse gear may be in response to a determination that the vehicle is about to ascend a gradient. This determination may be made by the driver or may be made by a system of the vehicle. Such a system may comprise a visual (e.g. camera) system, a radar system, a GPS or other navigation system, or an ultrasonic detection system, such as may be used nominally as a parking sensor system. Such a system may comprise software for making a determination that the input of a camera, radar, GPS etc. indicates that a gradient is about to be attempted.

In an embodiment, a condition for selecting the lowest forwards gear and/or pre-selecting a reverse gear may be detection of a threshold attitude of a vehicle—e.g. detection that the vehicle is at an angle of pitch at or above a certain threshold. In an embodiment, a vehicle or system within a vehicle may be provided with a gyroscope, for example a 3-axis gyroscope, and by way of example only, 40 degrees of pitch may be a pre-determined threshold. If the gyroscope detects that the vehicle is pitched to this degree, the lowest forwards gear may then be selected and/or a reverse gear may be pre-selected. In an embodiment, a vehicle or system therein may be provided with an inclinometer which is able to directly determine a vehicle attitude, such as pitch.

A condition for selection of a lowest forwards gear and/or pre-selection of a reverse gear may be a torque threshold. For example, if the total available torque of the engine is being demanded and/or approached (for example, if a demand of 95% of available engine torque is reached), then it may be determined that a stall or a hill ascent failure may be imminent. Accordingly, reverse may be pre-selected so that reverse is quickly available in the event that a stall or other mode of hill ascent failure then occurs.

Detection of an ascent failure may be consistent with the detection of a condition. A condition for determining detection of an ascent failure, and thus selecting reverse, following previous steps of pre-selection of reverse, which may be in conjunction with or following selection of a low, lowest or $1^{st}$ forwards gear may be one or more of:

a torque threshold being reached;

a sudden change in torque demand or a sudden change in wheel speed (these may be consistent with a wheel losing traction and slipping);

a detection of a lack of vehicle movement consistent with a wheel speed—this may be, for example, a detection of a GPS signal indicating vehicle immobility whilst in contrast any or all wheels of the vehicle may be moving or there may be an amount of wheel slip occurring, it may be that alternatively, a radar system or camera or camera system may indicate a lack of vehicle movement—such a system may directly measure vehicle speed over the ground;

a detection of a pre-determined amount of wheel slip, by means of detecting an amount of wheel slip, methods for which are known to those skilled in the art;

a detection of a certain threshold of wheel slip as measured in accordance with methods known in the art;

an estimation by a traction control system or similar that the total limit of traction available to the vehicle has been reached and/or that no more traction may be gained—methods of making such estimations are known in the art;

a cessation in demand for power or torque; such a cessation may be sudden, such as consistent with a foot being entirely removed from an accelerator pedal;

an application of brakes; such a brake application may be sudden, such as consistent with a driver's foot pressing hard and suddenly on a brake pedal;

a cessation in demand for power or torque coupled with a braking demand; such as may be consistent with a driver's foot releasing an accelerator pedal and moving to and applying the brake pedal; in embodiments, the braking demand may occur as an accelerator pedal is released or prior to the accelerator pedal being released, consistent with left-foot braking or 'heel and toe' techniques;

a condition in which a low or the lowest possible forward gear ratio selection has been made and the engine is at its maximum torque, power or throttle setting; optionally, coupled with a determination that total traction available has been reached/no more traction may be gained; and a condition in which a low or the lowest possible forward gear ratio selection has been made and the engine is at a threshold or pre-determined proportion of the maximum torque, power or throttle setting—by way of example, 99% or 95%; optionally, coupled with a determination that total traction available has been reached/no more traction may be gained.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

A method in accordance with an embodiment of the present invention is described herein with reference to the accompanying Figures.

Figure 4:
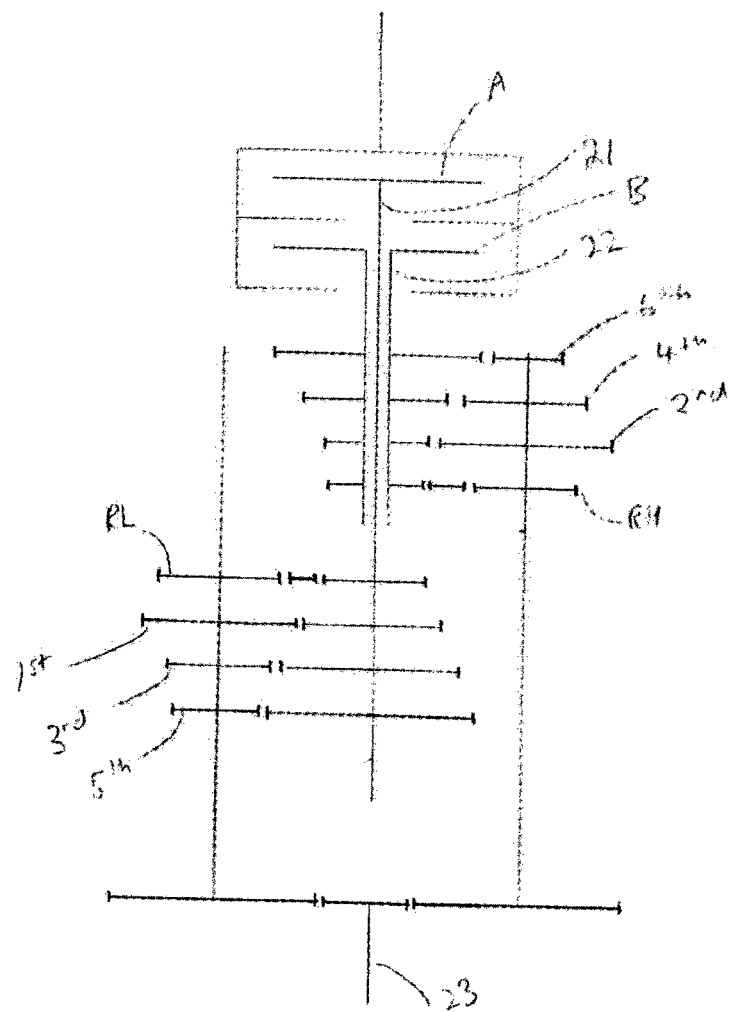
FIG. 4 shows a schematic illustration of a dual clutch gearbox which may be used in accordance with aspects of the invention.

FIG. 4 is a diagrammatic representation of a multi-speed constant mesh dual clutch transmission (DCT) having two inputs (21, 22), each with an associated friction clutch (A, B), one output (23), two or more forward speed ratios and two or more reverse speed ratios between said inputs and output, said speed ratios comprising individually selectable gear wheel trains, one of said forward speed ratios and one of said reverse speed ratios being associated with one input, one of said forward speed ratios and one of said reverse speed ratios being associated with the other input; said gearbox being adapted for pre-selection of a next required speed ratio in use, and for shifting from a current speed ratio to said next required speed ratio by shifting drive between said inputs; wherein said speed ratios are arranged for pre-selection to provide a shift between two forward speed ratios, a shift between two reverse speed ratios, and/or a shift between forward and reverse speed ratios.

In the embodiment shown, the first input (21) is associated with clutch A and the following gear ratios: Reverse Low (RL), $1^{st}$, $3^{rd}$, and any further 'odd' ratios, such as $5^{th}$ gear. The second input (22) is associated with clutch B and the other gear ratios Reverse High (RH), $2^{nd}$, $4^{th}$ and any further 'even' ratios, such as $6^{th}$.

Figure 1:
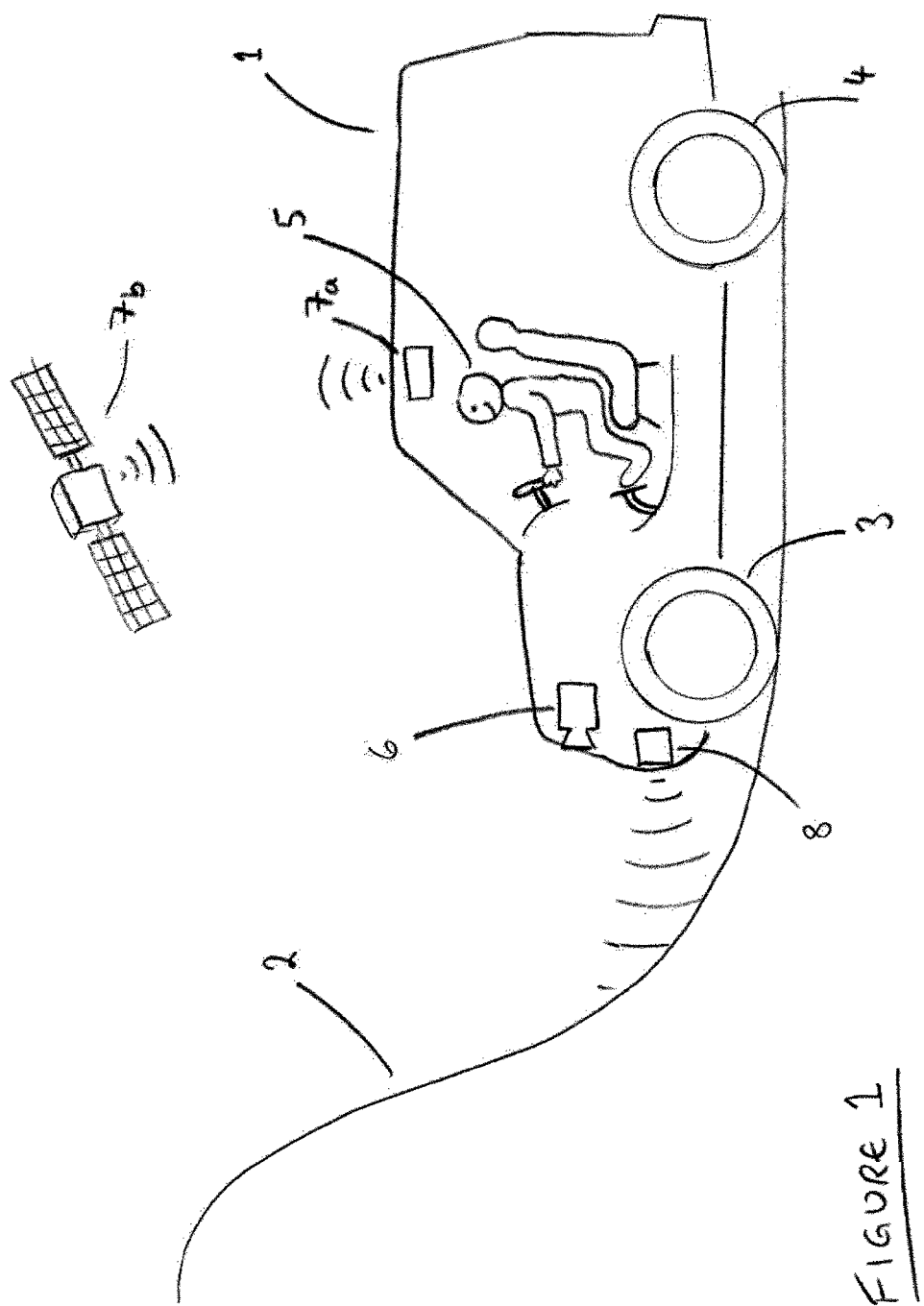
FIG. 1 shows a vehicle on approach to a hill on which there is a possibility of a hill ascent failure.
Figure 2:
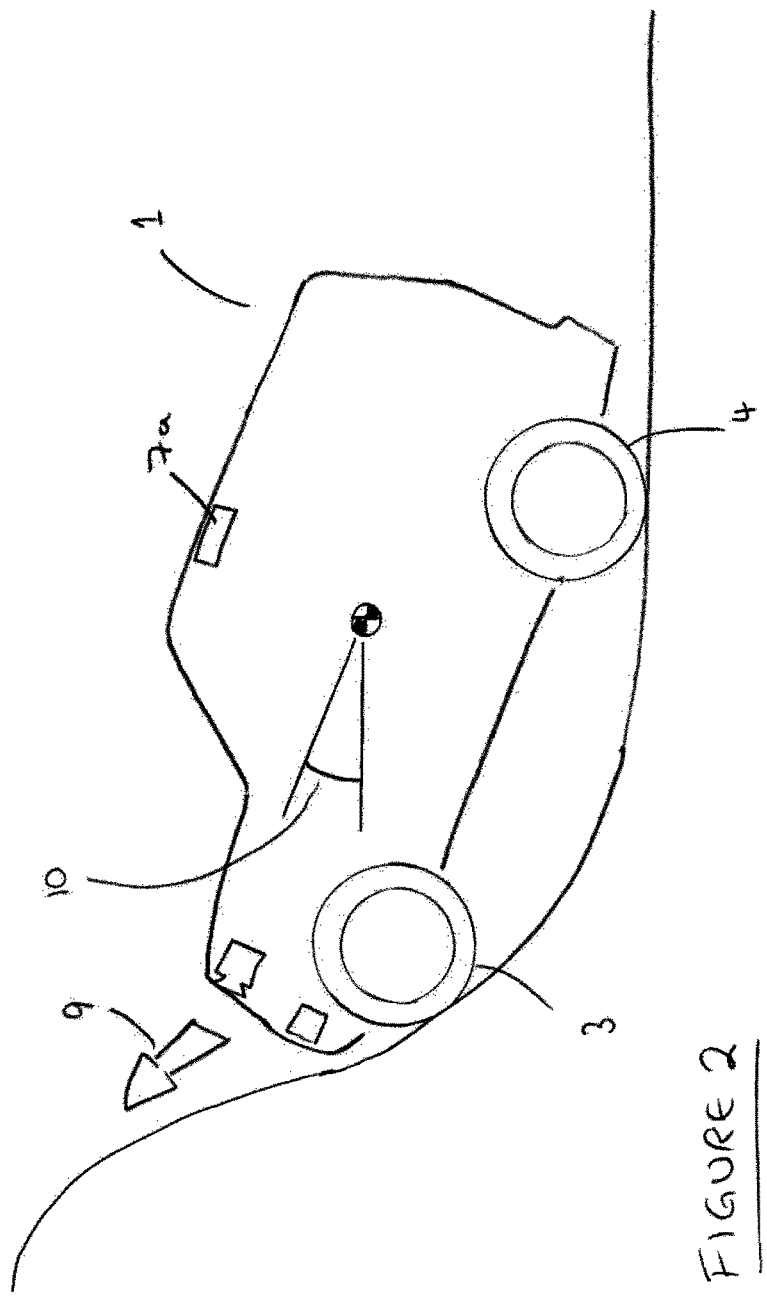
FIG. 2 shows a vehicle beginning to ascend a hill.
Figure 3:
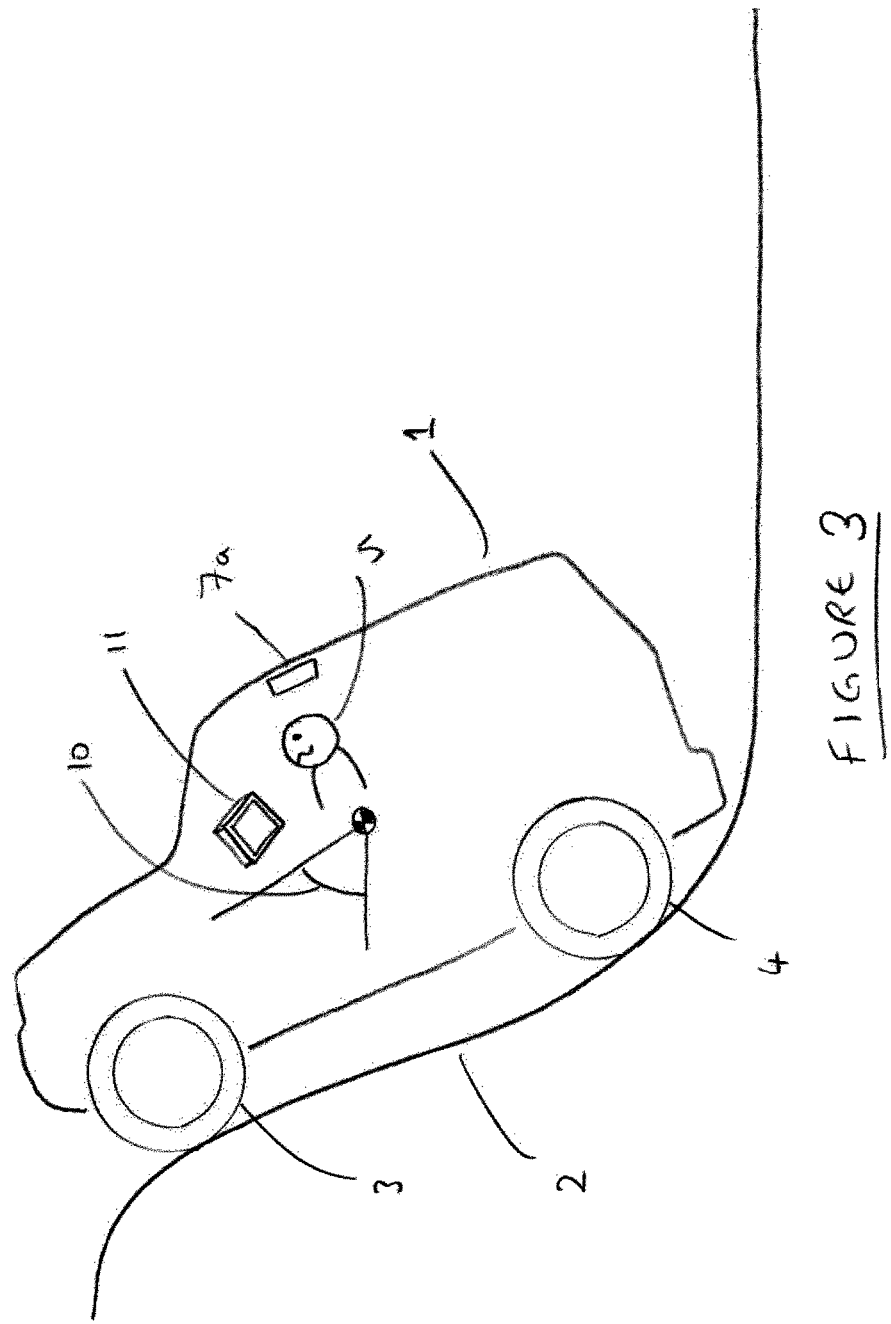
FIG. 3 shows a vehicle at the point of a hill ascent failure.

The vehicle shown in FIGS. 1, 2 and 3 is provided with such a transmission.

FIG. 1 illustrates a vehicle 1 provided with a DCT (not shown in FIG. 1), such as the one illustrated in FIG. 4. Vehicle 1 is on approach to a hill/gradient, 2. Drive torque from an engine of the vehicle (not shown) is supplied, via the DCT, to wheels of the vehicle, two of which can be seen (3, 4).

Either during this approach to the hill, or at a time when the vehicle stops prior to attempting the ascent, it may be determined that a hill ascent attempt, where the hill comprises a steep gradient, is about to be made. A driver (5) may make this determination by visual inspection of the terrain ahead. As a result, the driver may select a 'low range' mode of the vehicle, or an off-road mode such as 'rock crawl' or 'hill climb' or some other suitable mode of the vehicle, or may select or command selection of a low or the lowest available gear of the vehicle, in anticipation of the ascent. Alternatively, inspection of the terrain ahead by systems within the vehicle, utilising information from one or more cameras (6), a GPS or other satellite navigation system (7a, 7b), or a sensor (8) which may be an electromagnetic or sonic/ultrasonic proximity sensor, or part of a radar system, may be used to make the determination.

As a result of the determination that a steep hill ascent is about to be made, it may be that a low, or the lowest forward gear (i.e. $1^{st}$ in FIG. 4) of the DCT is selected. In some vehicle configurations, this lowest forward gear may be nominally only employed in particular circumstances, such as off-road situations.

Accordingly, a low or the lowest forwards gear of the DCT having been selected, and determination made that a steep hill ascent is about to be attempted, pre-selection of one of the reverse gears of the DCT (i.e. RH in FIG. 4) is also made.

In an alternative scenario, the vehicle 1, having previously been driving along flat terrain at a steady pace, simply carries on moving with no particular driver or other system input change and begins to ascend the hill.

FIG. 2 illustrates a vehicle 11 similar to that as described above and in FIG. 1, at a point at which it has started to move up hill 2 in the direction of arrow 9. In accordance with embodiments described above, the vehicle may already be in a low (or lowest, ie $1^{st}$ in FIG. 4) forwards gear, with a reverse gear (i.e. RH in FIG. 4) pre-selected.

In other embodiments however the vehicle may be in any one of a number of possible forward gears. As the vehicle begins to ascend the hill, however, the normal action of the transmission may result in a successive lowering of the in-gear ratio—for example, from $3^{rd}$ gear to $2^{nd}$ gear and hence to $1^{st}$ gear. The torque and/or power required from the engine of the vehicle, however, may not change or in fact may increase due to the steepening gradient of the ascent. In this situation, where the engaged gear is dropping but the power and/or torque requirement is not changing or even increasing, it may be determined that a steep hill ascent is being undertaken. At the time when a low gear, perhaps for example $1^{st}$ gear is selected, therefore, a reverse gear (i.e. RH in FIG. 4) is pre-selected.

In embodiments, the vehicle is provided with means (not shown) such as a gyroscope or accelerometer for determining that the vehicle is on a slope by detection of a pitch angle 10 of the vehicle. A threshold pitch value may be pre-determined (or determined, taking into account other factors, such as the altitude of the vehicle, which may for example affect the available power of an engine of the vehicle, or a vehicle mode which is selected) at which it may be considered that the hill being ascended is 'steep' and, as such, given that a possibility of an ascent failure exists or a low gear being necessary to ascend a slope of such an angle, a low or the lowest forwards gear may be selected, and additionally a reverse gear pre-selected. In embodiments, where the forwards speed of the vehicle is initially too great to effectively select a low or the lowest forwards gear (the hill having been approached at speed, for example), it may be that at the time a low or the lowest gear is selected during the ascent, pre-selection of the reverse gear automatically occurs. In an embodiment, pre-selection of the reverse gear occurs upon an intervention of a traction control system whilst the vehicle is ascending a slope.

In an embodiment, the speed of the vehicle may be determined. The torque required from the engine may also be determined. Determination that a hill ascent is being undergone may be made if the torque requirement reaches a certain threshold value. A determination of hill ascent may be made dependent on a combination of torque requirement and vehicle speed—if speed is low but torque requirement is high, for example. A map of torque vs. speed may be used to determine the ranges of torque and speed at which a hill ascent may be assumed. Said map may also take into account other factors such as altitude. Said map may take the form of a chart or reference table or look-up table stored in electronic format, in software, hardware, firmware or any other form of computer memory. Certain ranges of torque, or torque vs. speed, may be considered to indicate a hill ascent in which an ascent failure is a possibility. When such a determination is made or such a possibility indicated, pre-selection of a reverse gear may then occur.

In an embodiment, methods according to aspects of the invention may include a determination of the surface type over which the vehicle is travelling as it ascends a slope (or as it is about to ascend a slope). By way of example, for a given gradient, a sandy surface will be considered to offer an increased likelihood of an ascent failure as compared to a tarmac one. The determination of surface type may be made from driver selection of an appropriate mode of the vehicle—for example, a 'sand mode' or a 'grass/gravel/snow (GGS)' mode. Such a determination may affect the pitch angle at which a hill or slope is considered 'steep' and thus the time at which a pre-selection of a reverse gear, in preparation for a possible hill ascent failure, is made.

In embodiments, a vehicle may be provided with means for determining that 'wheel slip' is occurring at one or more wheels of the vehicle. It may be that when a certain threshold level of slip is detected, reverse gear is pre-selected. This would be because a hill ascent failure may be anticipated as a possibility, and in case it occurs. A determination of wheel slip as noted may be used in conjunction with the determination of surface type noted above, and/or in conjunction with a determination of gradient/slope, to trigger pre-selection of a reverse gear. A determination may also be made of which forwards gear the vehicle is in and this information may also be taken into consideration in order to decide whether to pre-select the reverse gear.

FIG. 3 illustrates a vehicle 1 which has reached a point on a slope 2 at which it can travel no further forwards—a hill ascent failure position. The vehicle is in a low or the lowest forwards gear, and has had a reverse gear pre-selected in accordance with any of the circumstances as described above in relation to FIG. 1 or 2 or in accordance with any of the other aspects or embodiments described herein.

In accordance with aspects and embodiments of the invention as described, it is then determined that a hill ascent failure has occurred.

In this example, hill ascent failure has occurred due to an inability to obtain sufficient traction to maintain forward motion of the vehicle. The driver is pressing hard on the accelerator and the engine is producing 99% (alternatives may include anything from 85 to 100%) of its potential torque output. A system of the vehicle has determined that wheel slip is occurring, and a sat-nav system 7a of the vehicle has determined that the vehicle is stationary. A further system of the vehicle has determined that the slope 2 being attempted is in excess of 35 degrees, by determining a pitch of the vehicle 10 from a gyroscope. A controller in the vehicle thus determines that a hill ascent failure has occurred.

The controller then takes the following actions:

It begins to apply wheel brakes by sending control signals to an ABS system of the vehicle. As it does so, it begins to disengage the forwards gear, so that when the wheels (3, 4) of the vehicle come to a halt, there is no net torque from the engine driving the wheels via the vehicle driveline. The controller in this instance is operatively connected to the transmission controller of the vehicle.

As the torque transmitted through the driveline reduces, the controller also moderates the driver torque request to the engine, such that at the time the wheels of the vehicle come to a halt, the engine is at idle speed.

Once the wheels of the vehicle come to a halt, the vehicle is then at rest on the slope with the wheel brakes on and the engine at idle, and a rest period begins. A message is then displayed to the driver 5 on a display screen 11 of the vehicle indicating that a hill ascent failure has occurred. Further reassuring messages may be displayed, such as 'vehicle in safe position' or similar. A further message is displayed on the display screen, which is also in this example a touch-screen, saying, for example; 'Press "acknowledge" button to continue with safe vehicle recovery', along with a virtual button labelled "acknowledge". Having seen the messages, the driver presses the "acknowledge" button.

A further message is then displayed, informing the driver that in order to recover the vehicle, a reverse gear will be engaged and the vehicle will reverse down the hill in 'hill descent mode'—also that the driver may initiate this, such as by displaying the further message 'to initiate this, release all foot pedals and then press the brake pedal. Release the brake pedal when ready to descend'. The part of the message to 'release all foot pedals and then' is in response to a determination by the controller that the driver is still in fact pressing down on the accelerator pedal, perhaps mistakenly thinking it is the brake pedal. If no pedals are pressed down, this part of the message may be omitted.

It will be appreciated that these messages as described herein are merely indicative of a type of message that may be displayed—other similarly worded messages or other means of conveying their meaning may be used.

In obedience to the instructions, the driver releases the accelerator pedal, then presses down and then releases the brake pedal. The pre-selected reverse gear is then engaged, and as this occurs, the wheel brakes are released. A hill descent mode of the vehicle is activated, and the vehicle begins to reverse down the slope. The vehicle may reverse down the slope without a hill descent mode activated. A driver acceleration input may also optionally be required or utilised.

It will be appreciated that details regarding control of clutches and transmission components may vary depending on the type of transmission a vehicle is equipped with—for example, an automatic transmission, an automated manual transmission or powershift transmission, or a DCT as given in the example illustrated with Figures herein. A skilled person will be capable of adapting the method described herein (or systems or controllers for implementing such) accordingly in order to enable the method, and it is anticipated that such adaptations will fall within the scope of the description and in particular within the scope of the claims attached hereto.

In an aspect, there is provided a method of hill ascent failure control for a vehicle provided with:
   an automatic transmission comprising at least one forward and at least one reverse selectable gear ratios;
   at least one wheel driven via the transmission;
the method comprising:
   Selecting and/or engaging a forward or reverse gear ratio;
   determining that a hill ascent has failed;
   applying brakes of the vehicle;
   selecting and/or engaging an opposing reverse or forward gear; and
   releasing the brakes.

In embodiments, there may be a step of driver confirmation that the driver is ready to begin a descent which may precede the brake release and/or the engagement of the opposing gear. The driver confirmation may be a movement of a transmission selector to a reverse setting.

In embodiments, the determination of hill ascent failure may be by any method or by determination as described elsewhere herein in relation to any other aspect of the invention. In embodiments, the step of selection of a forward or reverse gear ratio may occur by any method or by any determination as described herein in relation to any other aspect of the invention. In embodiments, the steps of determination of hill ascent failure, brake application, and engagement of an opposing gear may be automatic and under the control of a controller or similar. Further and/or additional steps may be similarly automatic. Such steps may include prompting a driver to indicate confirmation that further steps should be taken, which may occur in a manner as described elsewhere herein in relation to any other aspect.

It will be appreciated that various changes and modifications can be made to the present invention without departing from the scope of the present application. Further aspects of the present invention will now be set out in the accompanying numbered paragraphs:

1. A method of controlling a vehicle having a transmission comprising at least one forward and at least one reverse selectable gear ratio, at least two clutches, each able to connect at least one of said gear ratios to torque from an engine or prime mover of the vehicle and at least one wheel driven via the transmission, the method comprising:
   selecting and/or engaging a forward or reverse gear ratio via a first clutch;
   pre-selecting an opposing reverse or forward gear ratio via a second clutch;
   determining that a hill ascent has failed;
   selecting and/or engaging an opposing reverse or forward gear.

2. A method as described in paragraph 1 comprising the step:
   Automatically applying wheel brakes of the vehicle Upon a determination of a hill ascent failure.

3. A method as described in paragraph 1 wherein an ascent failure is determined by detection of any one or more or any combination of:
   a measurement of gradient in conjunction with vehicle speed;
   a measurement of gradient in conjunction with a friction estimation;
   a torque, power or throttle threshold being reached;
   a sudden change in torque or power demand;
   a sudden change in wheel speed;
   a lack of vehicle movement consistent with a measured wheel speed;
   a pre-determined or a threshold amount of wheel slip;
   a determination that the total traction available to the vehicle has been reached and/or that no more traction may be gained;
   a cessation in driver demand for power or torque;
   an application of brakes by a driver of the vehicle;
   a cessation in driver demand for power or torque coupled with a driver braking demand;
   a condition in which a low or the lowest possible forward or reverse gear ratio selection has been made and the engine is at its maximum torque, power or throttle setting;
   a condition in which a low or the lowest possible forward or reverse gear ratio selection has been made and the engine is at its maximum torque, power or throttle setting, coupled with a determination that total traction available has been reached and/or no more traction may be gained;
   a condition in which a low or the lowest possible forward or reverse gear ratio selection has been made and the engine is at a threshold or pre-determined proportion of its maximum torque, power or throttle;
   a condition in which a low or the lowest possible forward or reverse gear ratio selection has been made and the engine is at a threshold or pre-determined proportion of its maximum torque, power or throttle setting, coupled with a determination that total traction available has been reached and/or no more traction may be gained.

4. A method as described in paragraph 1 wherein the pre-selection of opposing reverse or forward gear occurs prior to or during ascent of a gradient by the vehicle.

5. A method as described in paragraph 4 wherein the pre-selection occurs in response to any one or more or any combination of the following;
   i/ Selection of a low or the lowest available forwards or reverse gear ratio;
   ii/ Selection of a drive mode, optionally a traction control mode, optionally a 'hill ascent' mode or a 'low range' mode;
   iii/ Selection of a low or the lowest available forwards or reverse gear ratio in response to selection of a drive mode, optionally a traction control mode, optionally a 'hill ascent' mode or a 'low range' mode;

iv/ Determination that previous gear ratio selections have been consecutively downwards;

v/ Determination that previous gear ratio selections have been consecutively downwards without a decrease in power or torque demanded of the engine of the vehicle;

vi/ Determination that selection of the lowest forwards or reverse gear ratio has occurred and a high power or torque demand is being made;

vii/ Detection of a threshold attitude of the vehicle;

viii/ Detection of a threshold pitch of the vehicle;

ix/ Detection of a threshold torque demand to the engine;

x/ Determination that the vehicle is ascending a gradient;

xi/ Determination that the vehicle is about to ascend a gradient.

xii/ Determination of a threshold amount of wheel slip xiii/ Determination that the vehicle is ascending a gradient and that a particular surface type is being (or about to be) traversed, said surface optionally being one of;
  a/ sand
  b/ snow
  c/ ice
  d/ dirt
  e/ grass
  f/ gravel xiv/ Determination that vehicle speed is below a first threshold whilst torque demand is above a second threshold.

6. A method as described in paragraph 1 wherein the selection of the forward or reverse gear ratio occurs in response to any one or more or any combination of the following:

i/ A command for selection of the low or the lowest available forwards or reverse gear ratio;

ii/ Selection of a drive mode, optionally a traction control mode, optionally a 'hill ascent' mode or a 'low range' mode;

iii/ Determination that previous gear ratio selections have been consecutively downwards;

iv/ Determination that previous gear ratio selections have been consecutively downwards without a decrease in power or torque demanded of the engine of the vehicle;

vi/ Detection of a threshold attitude of the vehicle;

vii/ Detection of a threshold pitch of the vehicle;

viii/ Detection of a threshold torque demand to the engine;

ix/ Determination that the vehicle is ascending a gradient;

x/ Determination that the vehicle is about to ascend a gradient;

xi/ Determination that the vehicle is ascending or about to ascend a gradient and that a particular surface type is being or about to be traversed, said surface optionally being one of;
  a/ sand
  b/ snow
  c/ ice
  d/ dirt
  e/ grass
  f/ gravel xiv/ Determination that vehicle speed is below a first threshold whilst torque demand is above a second threshold.

7. A method as described in paragraph 6 wherein the forward or reverse gear ratio selected is the lowest forward or reverse gear ratio available.

8. A method as described in paragraph 1 comprising the step of notifying a driver of the vehicle that there has been a hill ascent failure.

9. A method as described in paragraph 2 comprising the step of releasing the wheel brakes.

10. A method as described in paragraph 9 wherein the release of wheel brakes occurs in response to a driver input.

11. A method as described in paragraph 10 wherein the driver input is any one or more or any combination of:
  i/ A touchscreen input;
  ii/ A voice command;
  iii/ A brake pedal depression and/or release;
  iv/ An acceleration pedal depression and/or release;
  v/ A clutch pedal depression and/or release;
  vi/ Activation or use of a switch, toggle, knob or other rotary control;
  vii/ Selection or activation of a driving mode of the vehicle;
  viii/ Selection or activation of a control system of the vehicle;
  ix/ Selection of a gear ratio or equivalent of the vehicle.

12. A method of hill ascent failure control for a vehicle provided with:
  An automatic transmission comprising at least one forward and one reverse selectable gear ratios;
  At least one wheel driven via the transmission;
The method comprising the steps:
  Selecting a forward or reverse gear ratio;
  Determining that a hill ascent has failed;
  Applying brakes of the vehicle;
  Engaging an opposing reverse or forward gear.

13. A method as described in paragraph 12 comprising the step of notifying a driver of the vehicle that there has been a hill ascent failure.

14. A method as described in paragraph 12 comprising the step of releasing the wheel brakes.

15. A method as described in paragraph 14 wherein the release of wheel brakes occurs in response to a driver input.

16. A method described in paragraph 15 wherein the driver input is any one or more or any combination of:
  i/ A touchscreen input;
  ii/ A voice command;
  iii/ A brake pedal depression and/or release;
  iv/ An acceleration pedal depression and/or release;
  v/ A clutch pedal depression and/or release;
  vi/ Activation or use of a switch, toggle, knob or other rotary control;
  vii/ Selection or activation of a driving mode of the vehicle;
  viii/ Selection or activation of a control system of the vehicle;
  ix/ Selection of a gear ratio or equivalent of the vehicle.

17. A controller or system configured to implement the method of any of paragraphs 1 to 16.

18. A vehicle comprising a controller or system as described in paragraph 17.

19. A controller or system as described in paragraph 17, or as present in the vehicle of paragraph 18, which may be activated and/or deactivated by a vehicle driver.

The invention claimed is:

1. A method of controlling a vehicle having a transmission comprising at least one selectable forward gear ratio and at least one selectable reverse gear ratio, at least two clutches that are each able to connect at least one of said gear ratios to torque from an engine or prime mover of the vehicle and at least one wheel driven via the transmission, the method comprising:

at least one of selecting and engaging the at least one forward gear ratio or the at least one reverse gear ratio via a first clutch;

pre-selecting an opposing gear ratio of the at least one reverse gear ratio or the at least one forward gear ratio via a second clutch;

determining that a hill ascent has failed; and at least one of selecting and engaging the opposing gear ratio.

2. The method as claimed in claim 1 comprising automatically applying wheel brakes of the vehicle upon determining the hill ascent has failed.

3. The method according to claim 1 wherein determining that the hill ascent has failed is based on at least one of:
a measurement of gradient in conjunction with vehicle speed;
a measurement of gradient in conjunction with a friction estimation;
a torque, power or throttle threshold being reached;
a sudden change in torque or power demand;
a sudden change in wheel speed;
a lack of vehicle movement consistent with a measured wheel speed;
a pre-determined or a threshold amount of wheel slip;
a determination that total traction available to the vehicle has been reached or that no more traction may be gained;
a cessation in driver demand for power or torque;
an application of brakes by a driver of the vehicle;
a cessation in driver demand for power or torque coupled with a driver braking demand;
a condition in which a low or lowest possible forward or reverse gear ratio selection has been made and the engine is at a maximum torque, power or throttle setting;
a condition in which a low or lowest possible forward or reverse gear ratio selection has been made and the engine is at a maximum torque, power or throttle setting, coupled with a determination that total traction available has been reached or no more traction may be gained;
a condition in which a low or lowest possible forward or reverse gear ratio selection has been made and the engine is at a threshold or pre-determined proportion of maximum torque, power or throttle; and
a condition in which a low or lowest possible forward or reverse gear ratio selection has been made and the engine is at a threshold or pre-determined proportion of maximum torque, power or throttle setting, coupled with a determination that total traction available has been reached or no more traction may be gained.

4. The method according to claim 1 comprising pre-selecting the opposing gear ratio prior to or during ascent of a gradient by the vehicle.

5. The method according to claim 4 comprising pre-selecting the opposing forward or reverse gear ratio in response to at least one of:
selection of a low or lowest available forward or reverse gear ratio;
selection of any of a drive mode, a traction control mode, a 'hill ascent' mode or a 'low range' mode;
selection of a low or lowest available forward or reverse gear ratio in response to selection of any of a drive mode, a traction control mode, a 'hill ascent' mode or a 'low range' mode;
a determination that previous gear ratio selections have been consecutively downwards;
a determination that previous gear ratio selections have been consecutively downwards without a decrease in power or torque demanded of the engine of the vehicle;
a determination that selection of a lowest forward or reverse gear ratio has occurred and a high power or torque demand is being made;
detection of a threshold attitude of the vehicle;
detection of a threshold pitch of the vehicle;
detection of a threshold torque demand to the engine;
a determination that the vehicle is ascending a gradient;
a determination that the vehicle is about to ascend a gradient;
a determination of a threshold amount of wheel slip;
a determination that the vehicle is ascending a gradient and that a particular surface type is being or about to be traversed, wherein said surface type is one of:
sand,
snow,
ice,
dirt,
grass, and
gravel; and
a determination that vehicle speed is below a first threshold while torque demand is above a second threshold.

6. The method according to claim 1 wherein selecting the forward or reverse gear ratio occurs in response to at least one of:
a command for selection of a low or lowest available forward or reverse gear ratio;
selection of any of a drive mode, a traction control mode, a 'hill ascent' mode or a 'low range' mode;
a determination that previous gear ratio selections have been consecutively downwards;
a determination that previous gear ratio selections have been consecutively downwards without a decrease in power or torque demanded of the engine of the vehicle;
detection of a threshold attitude of the vehicle;
detection of a threshold pitch of the vehicle;
detection of a threshold torque demand to the engine;
a determination that the vehicle is ascending a gradient;
a determination that the vehicle is about to ascend a gradient;
a determination that the vehicle is ascending or about to ascend a gradient and that a particular surface type is being or about to be traversed, wherein said surface type is one of;
sand,
snow,
ice,
dirt,
grass, and
gravel; and
a determination that vehicle speed is below a first threshold while torque demand is above a second threshold.

7. The method according to claim 6 wherein the selected forward or reverse gear ratio is the lowest available forward or reverse gear ratio.

8. The method as claimed in claim 1 comprising notifying a driver of the vehicle when there has been a hill ascent failure.

9. The method as claimed in claim 2 comprising subsequently releasing the wheel brakes.

10. The method as claimed in claim 9 wherein releasing the wheel brakes occurs in response to a driver input.

11. The method as claimed in claim 10 wherein the driver input is at least one of:
a touchscreen input;

a voice command;
a brake pedal movement;
an acceleration pedal movement;
a clutch pedal movement;
activation or use of a switch, toggle, knob or other rotary control;
selection or activation of a driving mode of the vehicle;
selection or activation of a control system of the vehicle; and
selection of a gear ratio or equivalent of the vehicle.

12. A controller configured to implement the method of claim 1.

13. The controller as claimed in claim 12, wherein the controller is configured to be activated or deactivated by a vehicle driver.

14. A method of hill ascent failure control for a vehicle provided with an automatic transmission comprising at least one selectable forward gear ratio and at least one selectable reverse gear ratio, and at least one wheel driven via the transmission, the method comprising:
(i) at least one of selecting and engaging the at least one forward gear ratio or the at least one reverse gear ratio;
(ii) determining that a hill ascent has failed;
(iii) applying wheel brakes of the vehicle; and
(iv) at least one of selecting and engaging an opposing gear ratio of the at least one reverse gear ratio or the at least one forward gear ratio;
wherein any one or more of (ii), (iii) and (iv) are automatic.

15. The method as claimed in claim 14 comprising notifying a driver of the vehicle when there has been a hill ascent failure.

16. The method as claimed in claim 14 comprising subsequently releasing the wheel brakes.

17. The method as claimed in claim 16 wherein releasing the wheel brakes occurs in response to a driver input.

18. The method as claimed in claim 17 wherein the driver input is at least one of:
a touchscreen input;
a voice command;
a brake pedal movement;
an acceleration pedal movement;
a clutch pedal movement;
activation or use of a switch, toggle, knob or other rotary control;
selection or activation of a driving mode of the vehicle;
selection or activation of a control system of the vehicle; and
selection of a gear ratio or equivalent of the vehicle.

19. A controller for a vehicle having a prime mover, a transmission including a plurality of selectable forward gear ratios and at least one selectable reverse gear ratio, at least one clutch for coupling torque from the prime mover to one or more of the gear ratios and at least one wheel arranged to be driven by the transmission, wherein the controller is configured to:
detect a failed slope ascent by the vehicle;
automatically apply one or more brakes to the at least one wheel of the vehicle on detection of said failed slope ascent; and
following application of said one or more brakes, at least one of automatically selecting and automatically engaging one of the selectable gear ratios that is an opposite direction gear ratio to the one of the selectable gear ratios that was engaged during the failed slope ascent.

20. The controller as claimed in claim 19, wherein the controller is configured to be activated or deactivated by a vehicle driver.

* * * * *